United States Patent [19]

Gross et al.

[11] Patent Number: 5,605,215
[45] Date of Patent: Feb. 25, 1997

[54] CONVEYING AND CENTERING APPARATUS

[75] Inventors: Peter L. Gross, Indianapolis; Norman G. Poole, Plainfield, both of Ind.

[73] Assignee: Illinois Tool Works Inc., Glenview, Ill.

[21] Appl. No.: 619,996

[22] Filed: Mar. 21, 1996

Related U.S. Application Data

[62] Division of Ser. No. 320,905, Oct. 11, 1994.

[51] Int. Cl.⁶ .................................................. B65G 47/24
[52] U.S. Cl. ........................................ 198/345.1; 198/456
[58] Field of Search ............................. 198/345.1, 416, 198/456, 636

[56] References Cited

U.S. PATENT DOCUMENTS

| | | | |
|---|---|---|---|
| 3,089,576 | 5/1963 | Sauer et al. | 198/456 X |
| 3,225,890 | 12/1965 | Wiese | 198/456 |
| 4,191,055 | 3/1980 | Orem et al. | |
| 4,638,756 | 1/1987 | Collmann | 198/345.1 X |
| 4,741,429 | 5/1988 | Hattori et al. | 198/456 |
| 5,069,095 | 12/1991 | Ohneda et al. | 198/345.1 X |
| 5,101,959 | 4/1992 | Whitby | 198/456 |
| 5,368,643 | 11/1994 | Kuster | 198/456 X |
| 5,421,714 | 6/1995 | Morikawa et al. | 198/345.1 X |

Primary Examiner—D. Glenn Dayoan
Attorney, Agent, or Firm—Barnes & Thornburg

[57] ABSTRACT

A centering mechanism having two centering sections, each including a supporting frame extending in a generally parallel spaced-apart relation to the frame of the other centering section, first and second centering columns rotatably mounted in the frame, and a centering arm provided at an end of each centering column remote from the frame, first and second drive wheels for driving the first and second centering columns, respectively, and a flexible member trained about the first and second drive wheels to drive them in opposite directions, movement of the flexible member in a first direction driving the ends of the centering arms remote from the centering columns toward each other and movement of the flexible member in a second and opposite direction driving the ends of the centering arms remote from the centering columns away from each other.

13 Claims, 5 Drawing Sheets

CONVEYING AND CENTERING APPARATUS

This is a division of application Ser. No. 08/320,905, filed Oct. 11, 1994.

This invention relates to conveying apparatus. It is disclosed in the context of a "downstream" conveying and centering apparatus for an imbalance determining apparatus for rotary elements, but is believed to be useful in other applications as well.

Conveying and centering apparatus for imbalance determining mechanisms for rotary elements such as unmounted vehicle tires and vehicle wheel-and-tire assemblies is known. There are, for example, the apparatus illustrated and described in U.S. Pat. No. 4,191,055 and references cited in that patent. Such systems are often quite elaborate because they are designed and constructed as a single component for providing both the conveying and centering functions. However, in many circumstances only a conveying function is required, with centering being accomplished by other means. In certain circumstances, only centering is required, with conveying being accomplished by other means.

As used herein, "conveying" means presentation of an article at a work station at which some process step is to be performed on the article. In the context of the illustrated embodiment, conveying means the delivery of an article from a stopped or nearly stopped position at the "upstream" or inlet end of an imbalance determining station to a point in a work flow path at, or at a location substantially only laterally disposed from, the "capture" region of a spindle on which the article is to be mounted and spun to permit determination of any dynamic imbalance in the article. Illustratively, the article is an unmounted vehicle tire or a vehicle wheel-and-tire assembly.

As used herein, "centering" means the usually, although not essentially, subsequent movement of such an article from a point in the work flow path laterally disposed from a work station at which some process step is to be performed on the article to the point at which the process step is to be performed. In the context of the illustrated embodiment, centering means the delivery of an article from a point in a work flow path laterally disposed from the capture region of a spindle on which the article is to be mounted and spun to permit determination of any dynamic imbalance in the article to the capture region of the spindle.

Capture is usually achieved in such systems by a combination of the spindle configuration, which accommodates some displacement from precisely over the spindle axis, and elevation of the conveyor either to raise or lower the article to the level of the spindle. Elevator and spindle configurations are not dealt with in any great detail herein, as the present invention can be readily adapted for use with elevator and spindle configurations currently in use.

It is an object of the present invention to "modularize" the conveying and centering functions, that is, to provide conveying apparatus and centering apparatus which can function independently of each other in those circumstances where only conveying or only centering is required, but which can also be used together in those circumstances where both the conveying and centering functions are necessary.

According to an aspect of the invention, a conveyor comprises two conveyor sections. Each conveyor section comprises a frame extending generally longitudinally of the conveyor, a first splined shaft rotatable in an end of the frame, a second shaft rotatable in the other end of the frame, a first wheel on the first shaft and a second wheel on the second shaft. Means are provided for rotating the first wheel on one of the conveyor sections. A belt is trained about the first and second wheels and has a first side for engaging the first and second wheels and a second side for engaging an article conveyed along the conveyor. A relatively low friction surface is provided between the first and second wheels. The first side of the belt lies adjacent the relatively low friction surface to be supported thereby when an article is conveyed along the conveyor. The two conveyor sections are coupled by first and second bearing rollers. The first roller has a splined center opening for engaging the splines on the first shaft for receiving the ends of the first shaft to synchronize the movements of the belts on the two conveyor sections. The spacing between the conveyor sections is adjustable.

Illustratively according to this aspect of the invention, means for adjusting the spacing between the conveyor sections comprises first and second width adjustment shafts at the first and second ends of the conveyor, respectively. Each of the first and second width adjustment shafts has oppositely threaded regions spaced apart along their lengths. Thread followers on the frames follow the threaded regions of the first and second width adjustment shafts. The thread followers are provided adjacent the ends of the frame. Means are provided for rotating the width adjustment shafts.

Further illustratively according to this aspect of the invention, the means for rotating the width adjustment shafts comprises first and second sprockets provided on an end of each of the first and second width adjustment shafts, respectively. A chain is trained about the first and second sprockets. Means are provided for driving the chain selectively in a first direction synchronously to reduce the spacing between the conveyor sections at the first and second ends and to increase the spacing between the conveyor sections at the first and second ends.

Additionally illustratively according to this aspect of the invention, the second shaft is splined and the second bearing roller has a splined center opening for engaging the splines on the second shafts.

Illustratively according to this aspect of the invention, the means providing the relatively low friction surface comprises a block of a relatively low friction material mounted in the frame between the first and second wheels.

Further illustratively according to this aspect of the invention, the frames each include a plurality of support rollers for additionally supporting an article conveyed along the conveyor. The support rollers are rotatable in the frame.

According to another aspect of the invention, a centering mechanism comprises two centering sections, each including a supporting frame mountable to extend in generally parallel spaced-apart relation to the frame of the other centering section. First and second centering columns are rotatably mounted in the frame, and a centering arm is provided at an end of each centering column remote from the frame. First and second drive wheels are provided for driving the first and second centering columns, respectively, and a flexible member is trained about the first and second drive wheels to drive them in opposite directions. Movement of the flexible member in a first direction thus drives the ends of the centering arms remote from the centering columns toward each other, and movement of the flexible member in a second and opposite direction drives the ends of the centering arms remote from the centering columns away from each other.

Illustratively according to this aspect of the invention, a first idler wheel is rotatably mounted in each frame between the first centering column and a first end of the frame. A second idler wheel is rotatably mounted in each frame between the second centering column and a second end of the frame. The flexible member is also trained about the first and second idler wheels.

Additionally, illustratively according to this aspect of the invention, the centering mechanism further comprises means for driving the flexible members in the first and second directions.

Illustratively according to this aspect of the invention, the drive means comprises a piston-and-cylinder fluid motor.

Further illustratively according to this aspect of the invention, the piston-and-cylinder fluid motor comprises a double-acting, piston-and-cylinder fluid motor.

Additionally illustratively according to this aspect of the invention, the drive means comprises two double-acting, piston-and-cylinder fluid motors. A rod of a first one of the motors is coupled to a first end of each flexible member and a rod of a second one of the motors is coupled to a second end of each flexible member.

Further illustratively according to this aspect of the invention, each flexible member comprises a length of roller chain, and the first and second drive wheels comprise sprockets for engagement by the chain.

Additionally illustratively according to this aspect of the invention, the first and second idler wheels comprise sprockets for engagement by the chain.

The invention may best be understood by referring to the following description and accompanying drawings which illustrate the invention. In the drawings.

Figure 1:
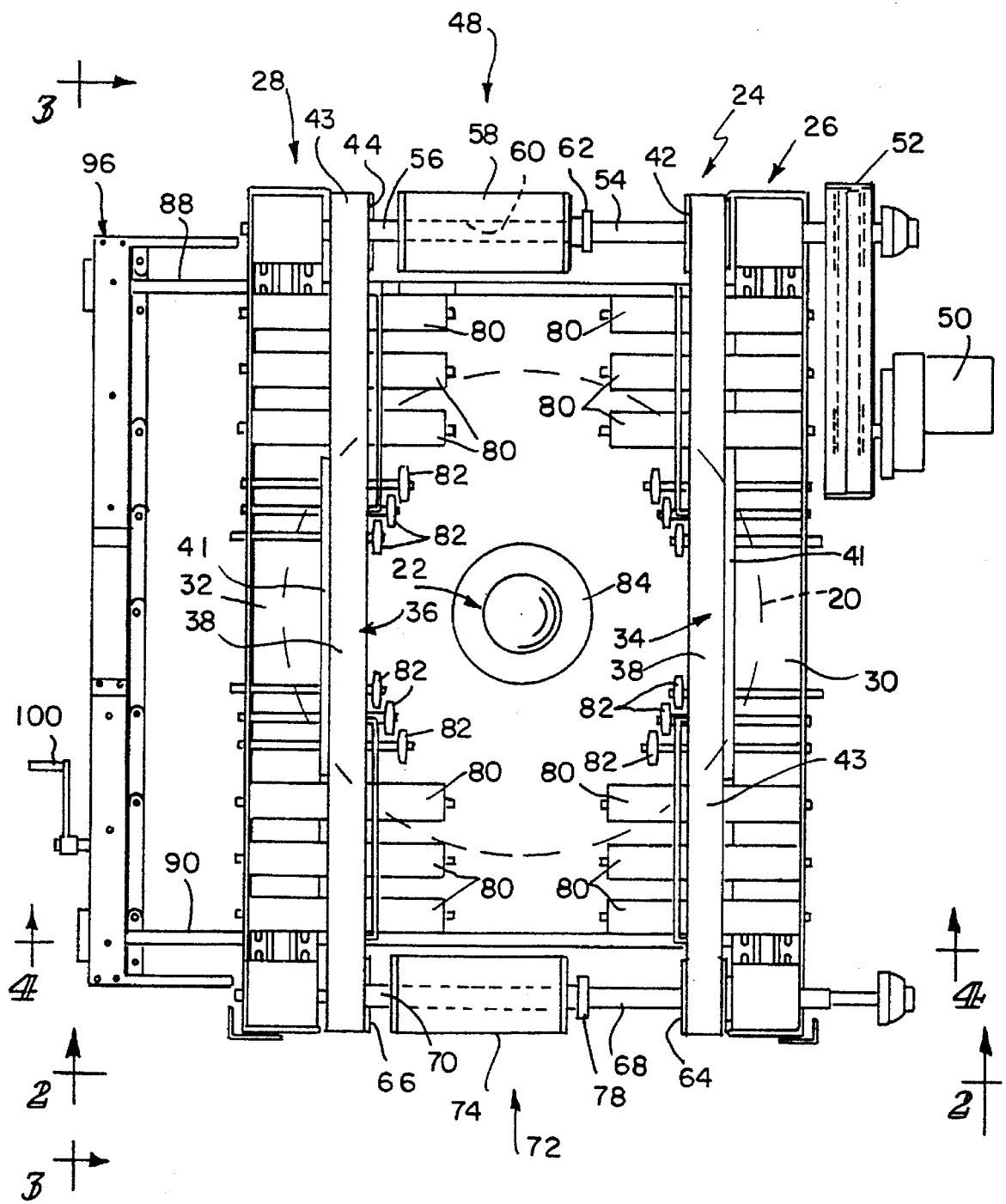
FIG. 1 illustrates a top plan view of a modular conveyor constructed according to the invention.
Figure 2:
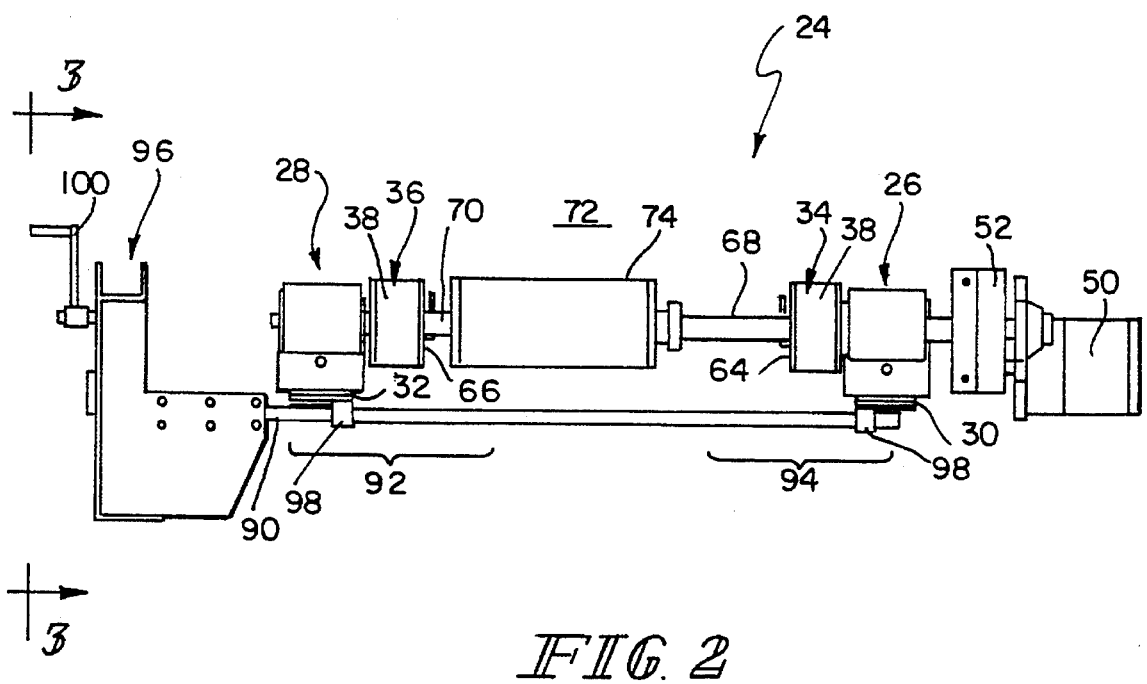
FIG. 2 illustrates a downstream end elevational view of the modular conveyor illustrated in FIG. 1, taken generally along section lines 2—2 of FIG. 1.
Figure 3:
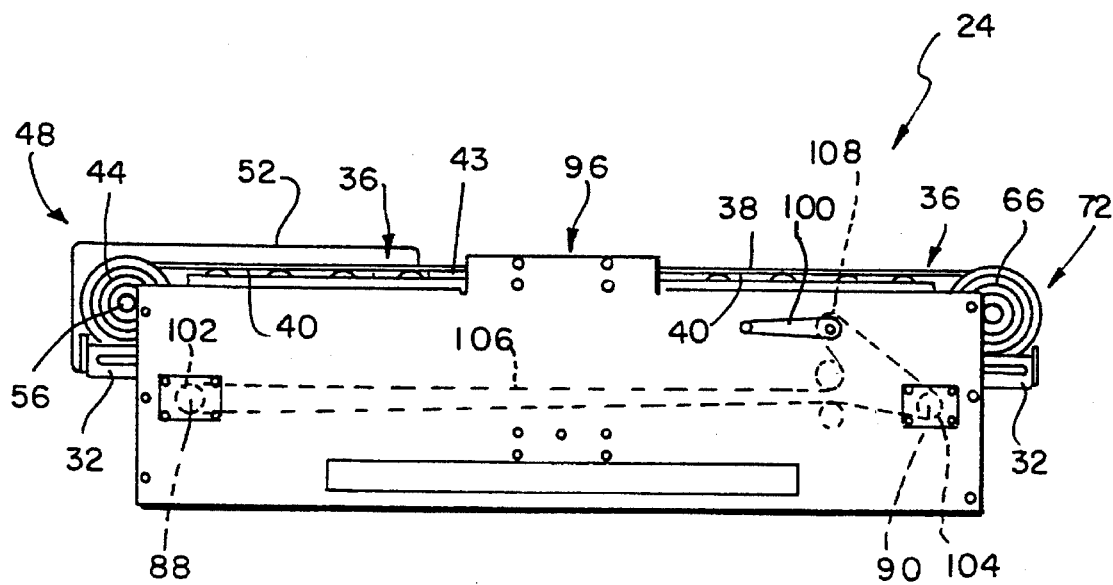
FIG. 3 illustrates a side elevational view of the modular conveyor illustrated in FIGS. 1–2, taken generally along section lines 3—3 of FIGS. 1–2.
Figure 4:
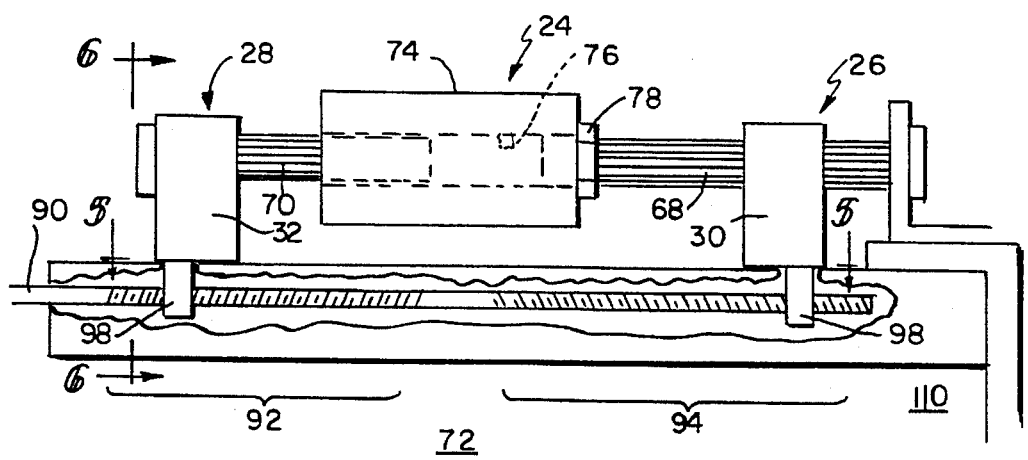
FIG. 4 illustrates a simplified diagrammatic and partly fragmentary sectional view of the modular conveyor illustrated in FIGS. 1–3, taken generally along section lines 4—4 of FIG. 1, mounted on an elevator to illustrate its mounting.
Figure 5:
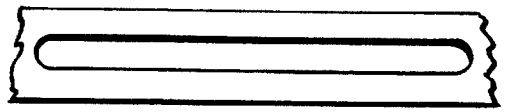
Figure 6:
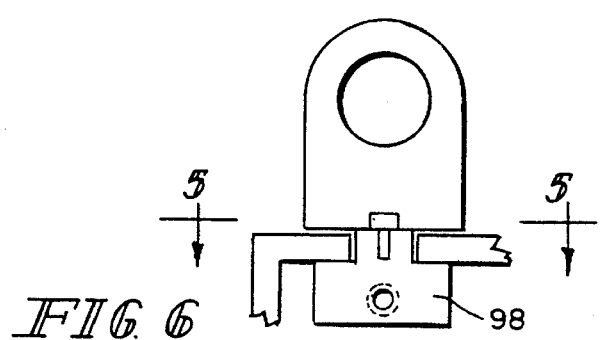
Figure 8:
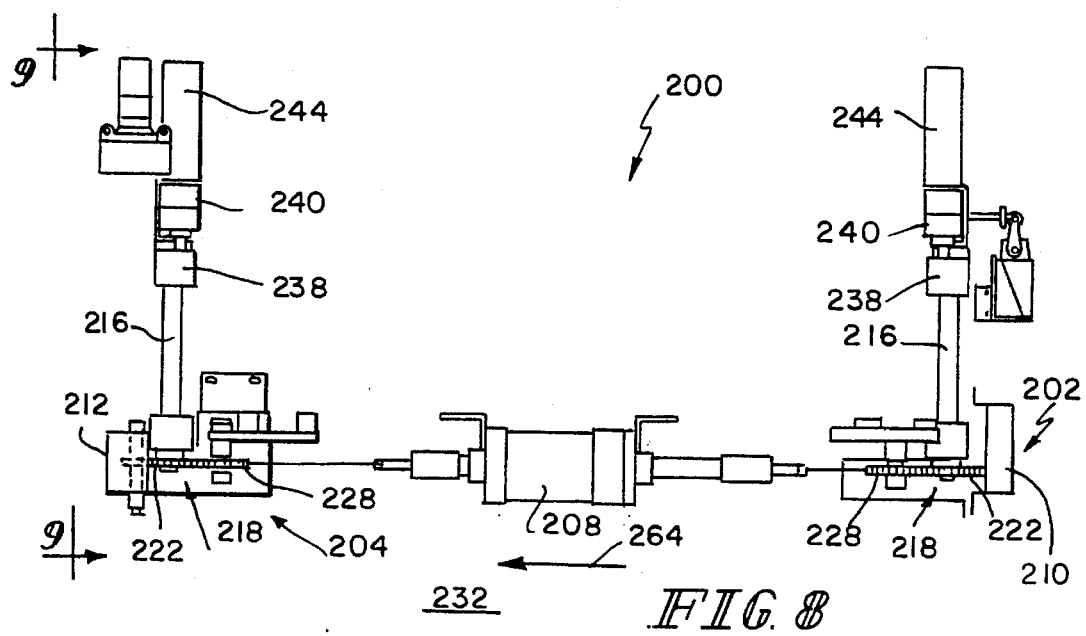
Figure 7:
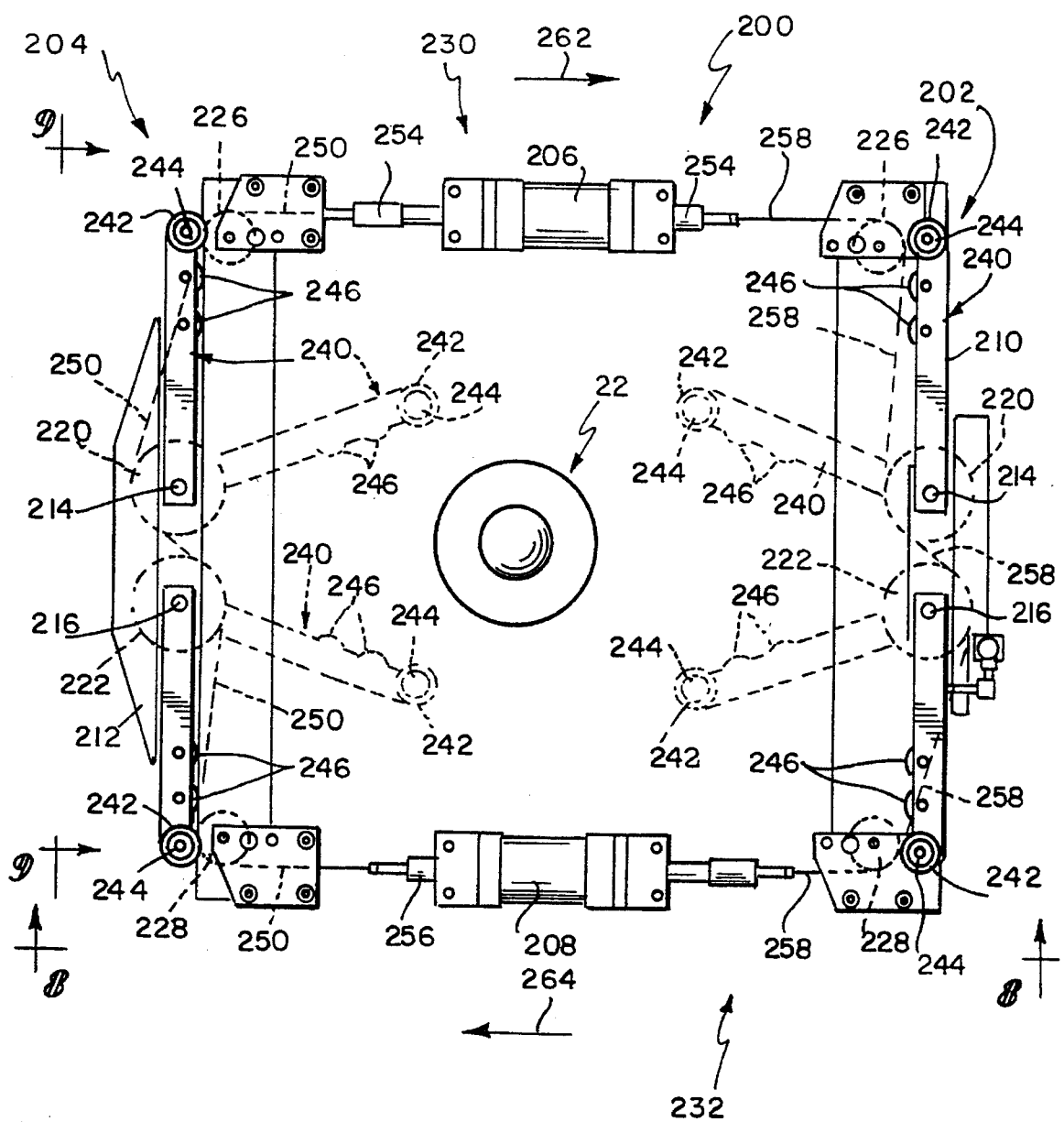
Figure 9:
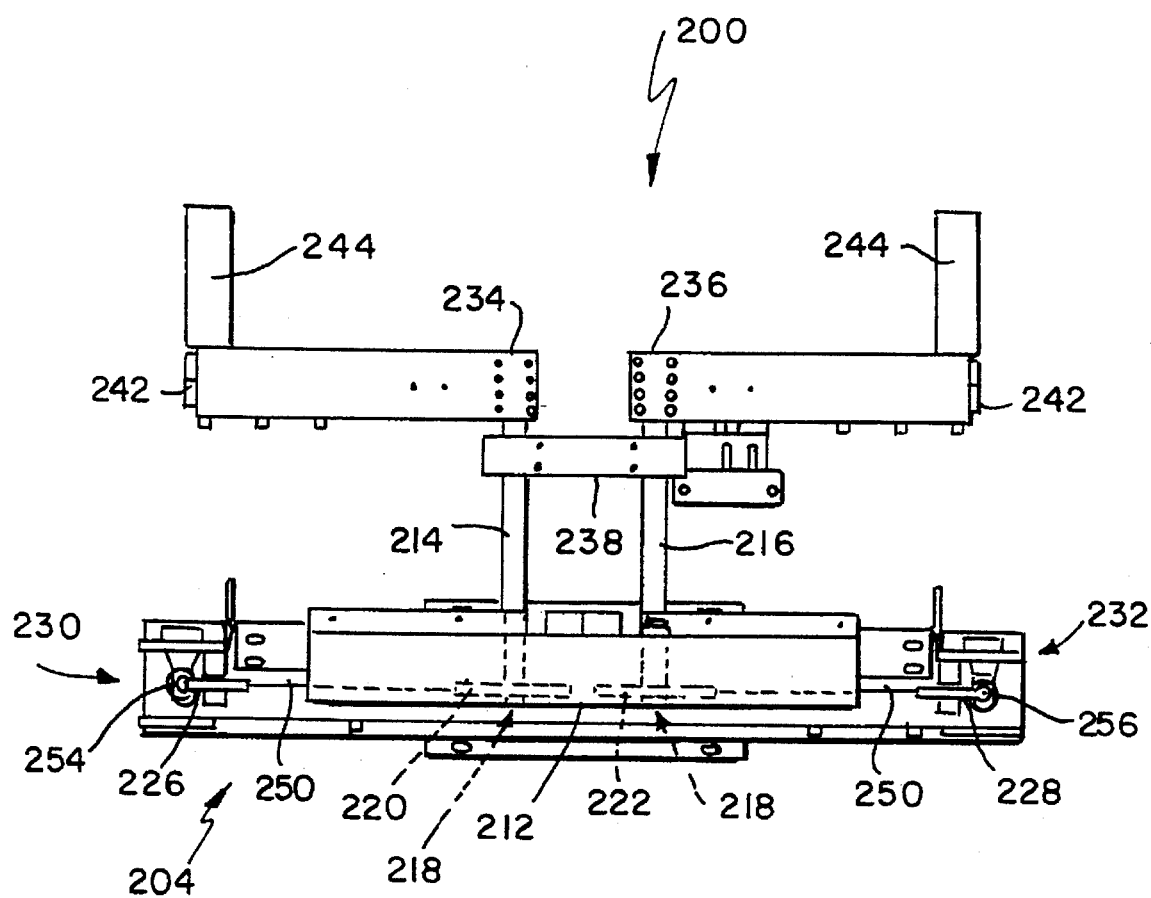

FIG. 5 illustrates a fragmentary sectional view of a detail of the apparatus illustrated in FIGS. 4 and 6, taken generally along section lines 5—5 of FIGS. 4 and 6;

FIG. 6 illustrates a fragmentary sectional view of a detail of the apparatus illustrated in FIG. 4, taken generally along section lines 6—6 of FIG. 4;

FIG. 7 illustrates a top plan view of a modular centering assembly constructed according to the invention;

FIG. 8 illustrates a downstream end elevational view of the modular centering assembly illustrated in FIG. 7, taken generally along section lines 8—8 of FIG. 7; and, FIG. 9 illustrates a side elevational view of the modular centering assembly illustrated in FIGS. 7–8, taken generally along section lines 9—9 of FIGS. 7–8.

Referring now to FIGS. 1–6, articles 20, the imbalance of which is to be determined by spinning the articles 20 sequentially on the spindle 22, are conveyed sequentially along a conveyor 24 constructed according to the invention. The conveyor 24 comprises two laterally spaced, substantially complementary, or mirror image, conveyor assemblies 26, 28, each including a supporting conveyor rail 30, 32, respectively which extends lengthwise of the conveyor 26, 28 assembly. Each conveyor assembly 26, 28 includes a rubber drive belt 34, 36, respectively, which is generally flat on its outwardly facing side 38 and toothed on its inwardly facing side 40. A smooth-surfaced, low-friction, for example, nylon, bearing block 41 underlies the upper bight 43 of each belt 34, 36 to support the article 20. The teeth on inside 40 are for synchronization of the movement of the belts 34, 36. If the belts 34, 36 are not synchronized, articles 20 being conveyed along the conveyor 24 by the belts 34, 36 may tend to "walk" laterally one way or the other, depending upon the belt 34, 36 speed differential. This is to be avoided, particularly where the centering apparatus of FIGS. 7–9 is not being used in conjunction with the conveyor 24.

The belts 34, 36 are driven by toothed drive wheels 42, 44, respectively, at the upstream, inlet end 48 of the conveyor 24. The toothed wheels 42, 44 in turn are driven by a fluid motor 50, illustratively an air motor, on one 26 of the conveyor assemblies, through a reducing transmission 52. The toothed wheels 42, 44 are on separate stub shafts 54, 56, respectively, which are both splined. The stub shafts 54, 56 are rotatably supported on the rails 30, 32, respectively. Power is transferred from stub shaft 54 to stub shaft 56 through a large center roller 58 having a center opening 60 complementarily splined to stub shafts 54, 56. The large center roller 58 is generally the first point of contact of the article 20 with the conveyor 24 as the article 20 enters the inlet end 48 of the conveyor 24. Roller 58 is movable laterally of conveyor 24 on shafts 54, 56, but its movement toward drive wheel 42 is limited by a collar 62 on shaft 54.

A toothed idler wheel 64, 66 is provided on a splined stub shaft 68, 70, respectively, at the downstream end 72 of each conveyor assembly 26, 28, respectively. The stub shafts 68, 70 are rotatably supported on the rails 30, 32, respectively. The splined shafts 68, 70 at the downstream ends 72 of the conveyor assemblies 26, 28, respectively, are coupled together by a large center roller 74 having a center opening 76 complementarily splined to stub shafts 68, 70. Roller 74 is movable laterally of conveyor 24 on shafts 54, 56, but its movement toward idler wheel 66 is limited by a collar 78.

Other than the center rollers 58, 74 at the entry and exit ends 48, 72, respectively, of the conveyor 24, none of the remaining rollers 80, 82 which potentially could contact the article 20 as it passes along the conveyor 24 are driven. The remaining, unpowered rollers' 80, 82's primary function is to support articles 20 moving along the conveyor 24. The smaller, unpowered rollers 82 toward the center of the conveyor 24, around the spindle 22, reduce the likelihood that smaller articles 20 will dip into the spindle 22 clearance opening 84.

The two complementary conveyor assemblies 26, 28 are joined by two screw threaded shafts 88, 90, each of which has a section 92 threaded in one direction and a section 94 threaded in the reverse direction. The screw threaded shafts 88, 90 are journalled for rotation in a side housing 96. The shafts 88, 90 extend through screw followers 98 at both ends of each complementary conveyor assembly 26, 28 so that rotation of the shafts 88, 90 in one direction brings the complementary conveyor assemblies 26, 28 closer together around the spindle 22 and rotation of the shafts 88, 90 in the other direction retracts the complementary conveyor assemblies 26, 28 further apart. Such rotation of the shafts 88, 90 can be effected either automatically, for example, by a computer-controlled electric motor., or manually. In the illustrated embodiment, rotation of the shafts 88, 90 is effected manually by a hand crank 100 journalled for rotation in side housing 96. A sprocket 102, 104 is provided adjacent the end of each shaft 88, 90, respectively, where it is journalled for rotation in the housing 96, and a roller chain 106 is trained about these two sprockets 102, 104 and a sprocket 108 on the handcrank 100. The shafts 88, 90 are rotated synchronously to insure equal spacing of the complementary conveyor assemblies 26, 28 at the entry 48 and exit 72 ends of the conveyor 24.

The conveyor 24 is supported on an elevator 110. Once an article 20 has come to a stop or nearly to a stop on the conveyor 24, for example, in the capture range of the spindle 22, the article 20 must be permitted to move freely in that limited range both in the upstream-downstream and lateral directions. Otherwise capture of the article 20 by the spindle 22, for example, as the elevator 110 lowers the conveyor 24 with respect to the spindle 22, may be rendered difficult or impossible. If this happens, damage to the spindle 22 or the conveyor 24 or both may result. Freedom of movement of articles 20 upstream or downstream in the capture region is enhanced by the choice of a fluid motor 50 characterized by easy back-driving, that is one which is not resistant to being rotated in a reverse direction when it is not being driven in a forward direction. An example is the Pneumatic Systems, Inc. Model DVAR-Y air motor.

Referring now to FIGS. 7–9, a centering mechanism 200 constructed according to the invention includes two assemblies 202, 204 and two double-acting, fluid, illustratively, pneumatic piston-and-cylinder, motors 206, 208, all of which bolt or otherwise attach to an imbalance determining machine elevator 110. The assemblies 202, 204 attach to the longitudinally extending sides of the elevator 110 and the air motors 206, 208 attach to the transversely extending ends of the elevator 110. Although other mountings are possible, this is a quite convenient mounting. Each assembly 202, 204 includes a supporting frame 210, 212, respectively, and two upwardly projecting posts 214, 216 which are pivotally mounted at their vertically lower ends 218 in the frame 210, 212. A sprocket 220, 222 is mounted on the lower end 218 of each post 214, 216, respectively, generally within the frame 210, 212. Additional idler sprockets 226, 228 are rotatably mounted at the upstream 230 and downstream 232 ends of the frame 210, 212, respectively. The posts 214, 216 are joined adjacent their upper ends 234, 236, respectively, by a bracket 238. The posts 214, 216 extend rotatably through the bracket 238. The bracket 238 adds some rigidity to the assembly 202, 204. A centering arm 240 is fixed to the vertically upper end 234, 236 of each post 214, 216. The centering arm 240 is provided at its distal end 242 with a contact pin 244. Additional rollers 246 are rotatably mounted between the proximal 214, 216 and distal 242 ends of the arm 240 to provide relatively lower friction contact with an article 20 to be centered by the centering mechanism 200 during the centering process.

A length 250 of roller chain is attached at one end to one end of the piston rod 254 of the upstream air motor 206, is trained about the idler sprocket 226 at the upstream end 230 of the assembly 204, the outside (side away from the spindle 22) of the upstream sprocket 220, the inside (side toward the spindle 22) of the downstream sprocket 222, and the idler sprocket 228 at the downstream end 232 of the assembly 204, and is attached at its other end to one end of the piston rod 256 of the downstream air motor 208. On the other assembly 202, a length 258 of roller chain is attached at one end to the other end of the piston rod 254 of the upstream air motor 206, is trained about the idler sprocket 226 at the upstream end 230 of the assembly 202, the inside of the upstream sprocket 220, the outside of the downstream sprocket 222, and the idler sprocket 228 at the downstream end of the assembly, and is attached at its other end to the other end of the piston rod 258 of the downstream air motor 208. With this configuration, actuation of the piston rod 254 in the direction indicated by arrow 262 and of piston rod 256 simultaneously in the direction indicated by arrow 264 pivots all of centering arms 240 inward to their positions illustrated in broken lines in FIG. 7. As the contact pins 244 of all of arms 240 contact the article being centered over spindle 22, motors 206, 208 stall with the article approximately positioned in the capture region of the spindle 22. Actuation of piston rods 254, 256 simultaneous in the directions opposite arrows 262, 264, respectively, returns the centering arms 240 to their positions illustrated in solid lines, clear of spindle 22 and any other associated tooling such as, for example, conveyor 24.

What is claimed:

1. A centering mechanism comprising two centering sections, each including a supporting frame mountable to extend in generally parallel spaced-apart relation to the frame of the other centering section, first and second centering columns rotatably mounted in the frame, and a centering arm provided at an end of each centering column remote from the frame, first and second drive wheels for driving the first and second centering columns, respectively, and a flexible member trained about the first and second drive wheels to drive them in opposite directions, movement of the flexible member in a first direction driving the ends of the centering arms remote from the centering columns toward each other and movement of the flexible member in a second and opposite direction driving the ends of the centering arms remote from the centering columns away from each other.

2. The centering mechanism of claim 1 and further comprising first and second idler wheels, the first idler wheels rotatably mounted in each frame between the first centering column and a first end of the frame, the second idler wheels rotatably mounted in each frame between the second centering column and a second end of the frame, the flexible member also being trained about the first and second idler wheels.

3. The centering mechanism of claim 1 further comprising means for driving the flexible members in the first and second directions.

4. The centering mechanism of claim 3 wherein the drive means comprises a piston-and-cylinder fluid motor.

5. The centering mechanism of claim 4 wherein the piston-and-cylinder fluid motor comprises a double-acting, piston-and-cylinder fluid motor.

6. The centering mechanism of claim 5 wherein the drive means comprises two double-acting, piston-and-cylinder fluid motors, a rod of a first one of the motors being coupled to a first end of each flexible member and a rod of a second one of the motors being coupled to a second end of each flexible member.

7. The centering mechanism of claim 1 wherein each flexible member comprises a length of roller chain and the first and second drive wheels comprise sprockets for engagement by the chain.

8. The centering mechanism of claim 2 wherein each flexible member comprises a length of roller chain and the first and second idler wheels comprise sprockets for engagement by the chain.

9. The centering mechanism of claim 3 and further comprising first and second idler wheels, the first idler wheels rotatably mounted in each frame between the first centering column and a first end of the frame, the second idler wheels rotatably mounted in each frame between the second centering column and a second end of the frame, the flexible members comprising lengths of roller chain, the first and second idler wheels comprising sprockets for engagement by the chain.

10. The centering mechanism of claim 4 and further comprising first and second idler wheels, the first idler wheels rotatably mounted in each frame between the first centering column and a first end of the frame, the second idler wheels rotatably mounted in each frame between the second centering column and a second end of the frame, the flexible members comprising lengths of roller chain, the first and second idler wheels comprising sprockets for engagement by the chain.

11. The centering mechanism of claim 5 and further comprising first and second idler wheels, the first idler wheel rotatably mounted in each frame between the first centering column and a first end of the frame, the second idler wheels rotatably mounted in each frame between the second centering column and a second end of the frame, the flexible members comprising lengths of roller chain, the first and second idler wheels comprising sprockets for engagement by the chain.

12. The centering mechanism of claim 6 and further comprising first and second idler wheels, the first idler wheels rotatably mounted in each frame between the first centering column and a first end of the frame, the second idler wheels rotatably mounted in each frame between the second centering column and a second end of the frame, the flexible members comprising lengths of roller chain, the first and second idler wheels comprising sprockets for engagement by the chain.

13. The centering mechanism of claim 7 and further comprising first and second idler wheels, the first idler wheels rotatably mounted in each frame between the first centering column and a first end of the frame, the second idler wheels rotatably mounted in each frame between the second centering column and a second end of the frame, the first and second idler wheels comprising sprockets for engagement by the chain.

* * * * *